US005319049A

United States Patent [19]

Yoshioka et al.

[11] Patent Number: 5,319,049

[45] Date of Patent: Jun. 7, 1994

[54] IMPREGNATING WATERPROOFING COMPOSITION

[75] Inventors: Hiroshi Yoshioka, Tokyo; Ichiro Ono, Annaka, both of Japan

[73] Assignee: Shin-Etsu Chemical Co., Ltd., Tokyo, Japan

[21] Appl. No.: 738,042

[22] Filed: Jul. 31, 1991

[30] Foreign Application Priority Data

Aug. 2, 1990 [JP] Japan ................................ 2-205383

[51] Int. Cl.[5] ................................................ C08G 77/26

[52] U.S. Cl. ................................ 528/10; 106/287.11; 106/287.12; 106/287.13; 106/287.16

[58] Field of Search ............................ 528/34, 10, 39; 106/287.11, 287.12, 287.13, 287.16; 525/477

[56] References Cited

U.S. PATENT DOCUMENTS

| | | | |
|---|---|---|---|
| 4,433,013 | 2/1984 | Puhringer | 427/337 |
| 4,455,172 | 6/1984 | Kerserho | 106/109 |
| 4,648,904 | 3/1987 | De Pasquale et al. | 106/2 |
| 4,996,257 | 2/1991 | Saito et al. | 525/477 |
| 4,999,249 | 3/1991 | Deschler et al. | 428/447 |
| 5,051,129 | 9/1991 | Cuthbert et al. | 106/2 |

FOREIGN PATENT DOCUMENTS

| | | |
|---|---|---|
| 2029446 | 12/1971 | Fed. Rep. of Germany . |
| 2258901 | 6/1974 | Fed. Rep. of Germany . |
| 63-236581 | 10/1988 | Japan . |
| 1-44673 | 2/1989 | Japan . |
| 1-212287 | 8/1989 | Japan . |

OTHER PUBLICATIONS

Derwent Publications Ltd. Abstract JO 2145-652-A Nippon Oils and Fats KK Jun. 1990.

*Primary Examiner*—John C. Bleutge
*Assistant Examiner*—Margaret W. Glass
*Attorney, Agent, or Firm*—Finnegan, Henderson, Farabow, Garrett & Dunner

[57] ABSTRACT

An impregnating waterproofing composition suitable for treating inorganic materials, which is excellent not only in antifungal and mildewproofing, but also in waterproofness and durability, comprises an known organoalkylalkoxysilane or its derivative[component(A)] and another organosilicon compound containing a quaternary ammonium halide groups and having a condensable alkoxy group [component(B)] as the main ingredients.

2 Claims, No Drawings

IMPREGNATING WATERPROOFING COMPOSITION

BACKGROUND OF THE INVENTION

The present invention relates to an impregnating waterproofing composition and more particularly to an impregnating waterproofing composition excellent in waterproofing properties and durability and having excellent antifungal and mildewproofing properties, and thus is suitable for treating various inorganic materials such as concrete, brick, tile, clay tile and stony material.

There have been known impregnating waterproofing compositions comprising an organoalkylalkoxysilane or a hydrolyzate thereof or a cohydrolyzate of this silane with another organosilicon compound having a hydrolyzable silyl group (cf. Japanese Patent Laid-Open No. 236581/1988, No. 44673/1989 and No. 212287/1989, West German Patent No. 2,029,446 and No. 2,258,901 and U.S. Pat. No. 4,433,013 and No. 4,455,172).

These compositions are impregnated into pores of inorganic materials such as concrete, block, slate, brick, tile clay tile stony material and plaster to give a three-dimensional structure in the pores while binding to the substrate, thus forming a durable protective layer. Therefore they are particularly superior in durability to known organic polymer waterproofing materials comprising, for example, epoxy, acrylic or urethane resins and water-repellent materials based on an aqueous solution of methyl siliconate. Therefore these compositions are widely employed for the waterproofing of the above-mentioned inorganic materials.

Although these impregnating waterproofing compositions comprising organoalkylalkoxysilanes or derivatives thereof as the base have excellent characteristics, they have a serious disadvantage in that they are inherently apt to be stained with, for example, molds, fungi, algae and various dusts

SUMMARY OF THE INVENTION

An object of the present invention is to provide an impregnating waterproofing composition excellent in waterproofing properties and durability and having excellent in antifungal and mildewproofing properties.

The present inventors have conducted extensive studies in order to develop the impregnating waterproofing composition having excellent antifungal and mildewproofing properties. As a result, the present inventors have found that when an organosilicon compound as the component (A) comprising a known organoalkylalkoxysilane or a derivative thereof is mixed with another organosilicon compound containing a quaternary ammonium halide group as the component (B), the antifungal and antistatic properties of the quaternary ammonium halide group contained in the component (B) advantageously protect the composition from stains due to molds, fungi, moss, algae and dusts, and that the component (B) having a condensable alkoxy group forms a homopolymer or a copolymer with an alkylalkoxysilane via a reaction with the substrate and condensation among alkoxysilyl groups and the polymer thus formed is fixed in the pores of an inorganic material to exhibit a semipermanent durability, unlike an ordinary compound containing a quaternary ammonium halide group which is readily extracted with water and removed because the ammonium halide group is water-soluble.

The present inventors have thus found that the above object is attained by employing an impregnating waterproofing composition comprising:

A) about 80 to about 99.9 parts by weight of an organosilicon compound (the component (A)) represented by the general formula(1):

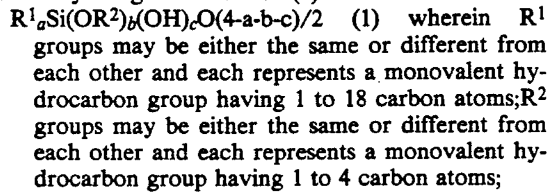

$R^1_aSi(OR^2)_b(OH)_cO(4\text{-}a\text{-}b\text{-}c)/2$ (1) wherein $R^1$ groups may be either the same or different from each other and each represents a monovalent hydrocarbon group having 1 to 18 carbon atoms; $R^2$ groups may be either the same or different from each other and each represents a monovalent hydrocarbon group having 1 to 4 carbon atoms;

a is from 0.2 to 1.5;

b is from 1 to 3;

c is from 0 to 1; and a+b+c is from 1 to 4, exclusive of 1; and

B) about 20 to about 0.1 parts by weight of another organosilicon compound (the component (B)) represented by the general formula(2):

$$\begin{array}{c} R^4{}_d \\ | \\ R^3Si(OR^5)_{3-d} \end{array} \quad (2)$$

wherein $R^3$ represents a monovalent organic group involving a quaternary ammonium halide group; $R^4$ and $R^5$ may be either the same or different from each other and each represents a monovalent hydrocarbon group having 1 to 4 carbon atoms; and d is 0, 1 or 2;

as the main ingredients.

The foregoing object, features and advantages of the present invention will be apparent from the following detailed description thereof

DESCRIPTION OF THE PREFERRED EMBODIMENTS

The organosilicon compound which serves as the component (A) of the impregnating waterproofing composition of the present invention is generally represented by the following general formula:

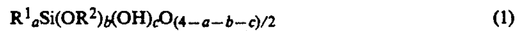

$$R^1_aSi(OR^2)_b(OH)_cO_{(4-a-b-c)/2} \quad (1)$$

In the above formula (1), $R^1$ groups may be either the same or different from each other and each represents a monovalent hydrocarbon group having 1 to 18, preferably 4 to 14, carbon atoms. Examples thereof include n-butyl, sec-butyl isobutyl, n-pentyl,n-hexyl cyclohexyl, n-octyl, 2-ethylhexyl, n-decyl, n-dodecyl and n-tetradecyl groups. $R^2$ group represents a monovalent hydrocarbon group having 1 to 4 carbon atoms selected from among, for example, methyl, ethyl, propyl and butyl groups. Subscript represents the number of the hydrocarbon groups binding to the silicon atom. When a is less than 0.2, the composition shows reduced impregnating properties and waterproofing properties, while when it exceeds 1.5, the durability of the composition is deteriorated. Therefore it should be from 0.2 to 1.5. Subscript b represents the number of the alkoxy groups binding to the silicon atom. When b is less than 1, the durability of the composition is reduced. When b exceeds 3, the waterproofing properties is deteriorated, and thus it is not good Therefore it should be from 1 to 3. Subscript c represents the number of the hydroxyl groups binding to the silicon atom. When it exceeds 1, the stability of the compound is deteriorated. Therefore it should be from 0 to 1.

The organosilicon compound to be used as the component (A) may be either a monomeric or a polymeric organopolysiloxane It is preferable that the molecular weight of this compound is 2,000 or less, since a molecular weight exceeding 2,000 would cause a lowering in the impregnation of the composition into a substrate. It may be either a single compound or a mixture of two or more of them.

Next, the organosilicon compound which serves as the component (B) of the impregnating waterproofing composition of the present invention is one represented by the following general formula:

$$R^3Si(R^4_d)(OR^5)_{3-d} \quad (2)$$

In the above formula (2), $R^1$ is a quaternary ammonium halide group such as $$\text{-}[CH_2CH_2CH_2\text{—}N\text{—}C_nH_{2n+1}]^+Cl^-$$

or $$\text{-}[CH_2CH_2CH_2\text{—}N(CH_2CH_2COOCH_3)(CH_2)_m\text{—}N(CH_2COOCH_3)\text{—}(CH_3)_2]^+Cl^-$$

wherein n is from 10 to 20 while m is 2 or 3, $R^4$ and $R^5$ may be either the same or different from each other and each represents a monovalent hydrocarbon group having 1 to 4 carbon atoms similar to the above mentioned $R^2$, and d is 0, 1 or 2. This compound imparts antifungal and mildewproofing properties to a known impregnating waterproofing composition comprising the aforesaid component (A).

The antifungal and mildewproofing properties are achieved by the quaternary ammonium halide group contained in the component (B). A common quaternary ammonium salt is inherently water-soluble and thus readily extracted with water and removed. Therefore the durability is lost when this salt is contained in an impregnating waterproofing composition. In contrast, the component (B) to be used in the impregnating waterproofing composition of the present invention contains the quaternary ammonium halide in the form of an alkoxysilyl derivative wherein the ammonium halide group is bound to an alkoxysilyl group which will cause polycondensation upon hydrolysis. This alkoxysilyl group is polycondensed with an alkoxysilyl group or a silanol group in a saturated hydrocarbon-substituted organosilicon compound in the component (A) to thereby form a water-insoluble siloxane copolymer in which the quaternary ammonium halide group is held. Thus this composition advantageously forms a waterproofing layer excellent in waterproofing properties and durability and having antifungal and mildewproofing properties.

When the amount of this component (B), based on about 80 to about 99.9 parts by weight of the component (A), is smaller than about 0.1 part by weight, no desired stainproofing properties based on the antifungal and mildewproofing properties can be achieved. When it exceeds about 20 parts by weight, on the other hand, the water resistance of the coating formed by the composition is deteriorated and thus the waterproofness and durability of the material treated therewith are deteriorated. Therefore it is necessary that the content of the component (B) range from about 0.1 to about 20 parts by weight.

The impregnating waterproofing composition of the present invention can be obtained by homogeneously mixing the components (A) and (B) at a given ratio and the addition of a solvent serves for this purpose Examples of the solvent include organic solvents, for example, alcohols such as methanol, ethanol, isopropanol, n-butanol and sec-butanol; aliphatic hydrocarbons such as n-hexane, cyclohexane and n-octane; aromatic hydrocarbons such as toluene and xylene; ketones such as acetone, methyl ethyl ketone and methyl isobutyl ketone; esters such as ethyl acetate, propyl acetate and butyl acetate: and multicomponent mixed solvents such as kerosine, petroleum ether, ligroin, and solvent naphtha; and water. Further, a mixture thereof may be used therefor.

The impregnating waterproofing composition of the present invention is thought to be useful in waterproofing inorganic materials such as cement concrete, mortar, block, slate, brick, tile, clay tile, stony material and plaster. The composition may be applied to the surface of the material to be treated by brushing, rolling, curtain coating, dip coating or spraying. The material to be treated may be impregnated with said composition in a coating weight of 1 to 1,000 g, preferably 10 to 200 g, per m, Thus the component (A), which comprises an organosilicon compound monomer or a polymer thereof having a low degree of polymerization and thus has a low surface tension, can be easily impregnated into the pores of the material to be treated to form an organosiloxane polymer having excellent waterproofing properties and a high durability through the hydrolysis and polycondensation of the alkoxysilyl group. Further, part of the alkoxysilyl groups are chemically bound to the M-OH groups (wherein M is a metal atom) present on the surface of the pores to thereby further improve the durability. Furthermore, the quaternary ammonium halide group in the component (B) imparts antifunga and mildewproofing properties. Thus the present invention is advantageous in that a waterproofing inorganic material having excellent antifungal and mildewproofing properties can be easily obtained thereby.

In the production of the composition, a surfactant or a hydrolysis catalyst may be preferably added in order to form an aqueous solution or dispersion of the organosilicon compound represented by the above general formula (1) which is inherently insoluble in water. Further, the composition may be optionally contain various additives such as coloring matters, stabilizers, fats and oils, waxes and fillers. Furthermore, the composition of the present invention may contain a catalyst for hardening the alkoxysilyl group or the silanol group, so long as the stability of the composition is not deteriorated thereby. Examples of the catalyst include metal salts of organic acids, metal alkoxides, metal chelates, organic amines and quaternary ammonium salts. Thus the hydrolysis and polycondensation of the composition in the pores of the material to be treated can accelerated.

EXAMPLES OF THE INVENTION

To further illustrate the present invention, the following Examples and Comparative Examples will be given, wherein the physicochemical properties of the materials to be treated were determined by the methods as will be specified below. [Water absorption]

An impregnating waterproofing agent is applied with a brush to the whole surface of a JIS mortar ($5\times5\times2.5$ cm) in such a coating weight as to give 100 $g/m^2$ of the active ingredients After curing at 25° C. and 50% RH for 7 days, the whole mortar is immersed in tap water for 28 days. The water absorption is calculated in accordance with the following equation:

$$\text{water absorption (\%)} = \frac{(\text{weight of treated mortar}) - (\text{weight of untreated mortar})}{(\text{weight of untreated mortar})} \times 100$$

Alkali resistance

A mortar test piece prepared in the same manner as the one described above relating to the water absorption test is immersed as a whole in a 5% aqueous solution of sodium hydroxide for 7 days. The alkali resistance is calculated in accordance with the following equation:

$$\text{alkali resistance (\%)} = \frac{(\text{weight of treated mortar}) - (\text{weight of untreated mortar})}{(\text{weight of untreated mortar})} \times 100$$

Salt insulation penetration depth of chloride ion

A mortar test piece prepared in the same manner as the one described above relating to the water absorption test is immersed as a whole in a 3% aqueous solution of common salt for 28 days. After taking out of the solution and cracking, the cross section of the mortar is subjected to the fluoresceine color reaction to thereby measure the penetration depth of chloride ions.

Durability

A mortar test piece prepared in the same manner as the one described above relating to the water absorption test is exposed to a Sunshine Weatherometer (mfd. by Suga Test Instruments, Co., Ltd.) for 1,000 hours and then immersed as a whole in tap water for 28 days. The water absorption is calculated in accordance with the equation given above relating to the water absorption test.

Penetration depth

A mortar test piece prepared in the same manner as the one described above relating to the water absorption test is cracked and water is sprayed to the cross section to measure the thickness of the water-repellent layer.

Mildewproofing properties

An impregnating waterproofing agent is applied with a brush to the whole surface of a JIS smoked clay tile test piece ($2\times2\times0.5$ cm) in such a coating weight as to give 100 g/m, of the active ingredients. After curing at 25° C. and 50% RH for 7 days, a test sample is obtained.

Separately, 5 species of molds including Trichoderma T-1, Aspergillus niger, Aureobacidium Pullulans and Cladosportium herbarum as specified in JIS z 2911 and an unidentified strain sampled from the surface of the tile are mixed together so as to give a mold spore suspension.

Next, the test sample is placed on an agar plate in a Petri dish and the mold spore suspension is sprayed thereon uniformly. After covering the dish, the molds are cultured at 30° C. for 21 days to observe the growth of the molds with the naked eye.

○: no mold grows and a growth inhibition zone is observed around the test piece, Δ: molds grow to an extent of $\frac{1}{2}$ to $\frac{3}{4}$, and x : the growth of the molds is obvious.

Further, an impregnating waterproofing agent is applied with a brush to the whole surface of a JIS smoked clay tile piece ($2\times2\times0.5$ cm) in such a coating weight as to give 100 $g/m^2$ of the active ingredients. After curing at 25° C. and 50% RH for 7 days, the test piece is immersed in tap water as the whole for 28 days to thereby prepare a test sample. The obtained sample is then subjected to the same mold growth test as the one described above to thereby evaluate the mildewproofing properties after immersion in water.

Stainproofing properties

An impregnating waterproofing agent is sprayed onto the whole surface of a marketed concrete block in such a coating weight as to give 100 $g/m^2$ of the active ingredients. After curing at 25° C. and 50% RH for 7 days, a test sample is obtained. This sample is exposed to outdoor weather at a location of 1 m above the ground for 12 months. Then the appearance of the sample is evaluated with the naked eye.

○: hardly stained,

Δ: somewhat stained, and x: stained and plants are grown.

Examples 1 to 5

An alkylalkoxysilane of the formula $n-C_{10}H_{21}Si(OCH,)$, or an alkylalkoxysiloxane of the formula $(C_{10}H_{21})_{0.5}(CH_3O)_{2.17}SiO_{0.67}$ or $(C_8H_{17})_{0.5}(CH_3O)_{2.0}SiO_{0.75}$ was used as the organosilicon compound of the component (A) while an organosilicon compound represented by the following formula:

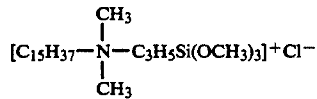

was used as the component (B). These materials were mixed together at a ratio as specified in Table 1 and 300 g of isopropanol was added to the mixture. The physicohemical properties of the impregnating waterproofing compositions thus obtained were examined to give the results of Table 3.

Comparative Examples 1 to 5

As shown in Table 2, an alkylalkoxysilane of the formula $n-C_{10}H_{21}Si(OCH_3)_3$ or an alkylalkoxysiloxane of the formula $(C_{10}H_{21})_{0.5}(CH_3O)_{2.17}SiO_{0.67}$ was used as the organosilicon compound of the component(A) while no organosilicon compound as the component(B) was used. In Comparative Examples 1 and 2, the composition was diluted with 300 g of isopropanol. In Comparative Example 3, salicylanilide chloride was added, and diluted with isopropanol. In Comparative Example 4, a methylpolysiloxane resin "Polon A" [a marketed silicone-type water repellent manufactured by Shin- Etsu Chemical Co., Ltd.] was used. In Comparative Example 5, an untreated sample was used. The physicochemical properties of the compositions thus obtained in Comparative Examples 1 to 5 were examined to give the results of Table 3.

TABLE 1

| Ex. No. | Component (A) (g) | | Component (B) (g) | | Solvent (g) |
|---|---|---|---|---|---|
| 1 | n-$C_{10}H_{21}Si(OCH_3)_3$ | 98 | $[C_{18}H_{37}-N(CH_3)_2-C_3H_6Si(OCH_3)_3]^+Cl^-$ | 2 | isopropanol 300 |
| 2 | " | 95 | " | 5 | " |
| 3 | " | 90 | " | 10 | " |
| 4 | $(C_{10}H_{21})_{0.5}(CH_3O)_{2.17}SiO_{0.67}$ | 95 | " | 5 | " |
| 5 | $(C_8H_{17})_{0.5}(CH_3O)_{2.0}SiO_{0.75}$ | 95 | " | 5 | " |

TABLE 2

| Ex. No. | Waterproofing component (g) | | Additive (g) | | Solvent (g) |
|---|---|---|---|---|---|
| 1 | n-$C_{10}H_{21}Si(OCH_3)_3$ | 100 | — | | isopropanol 300 |
| 2 | $(C_{10}H_{21})_{0.5}(CH_3O)_{2.17}SiO_{0.67}$ | 100 | — | | isopropanol 300 |
| 3 | n-$C_{10}H_{21}Si(OCH_3)_3$ | 95 | salicylanilide chloride | 5 | isopropanol 300 |
| 4 | Polon A | 100 | — | | — |
| 5 | untreated | — | — | | — |

TABLE 3

| Item Ex. No. | Water absorption (%) | Alkali resistance (%) | Salt insulation (mm) | Water absorbency (water absorption %) | Penetration depth (mm) | Mildewproofness initial | Mildewproofness after immersion in water | Stain-proofness |
|---|---|---|---|---|---|---|---|---|
| Ex. 1 | 2.4 | 1.6 | 1 or less | 2.4 | 3.0 | O | O | O |
| 2 | 2.6 | 1.6 | " | 2.6 | 3.0 | O | O | O |
| 3 | 3.3 | 2.0 | " | 3.4 | 3.5 | O | O | O |
| 4 | 2.5 | 2.2 | " | 2.6 | 2.5 | O | O | O |
| 5 | 2.6 | 2.3 | " | 2.3 | 2.5 | O | O | O |
| Comp. Ex. 1 | 2.6 | 1.3 | " | 2.6 | 3.0 | X | X | Δ |
| 2 | 2.4 | 1.8 | " | 2.4 | 2.0 | X | X | Δ |
| 3 | 3.8 | 3.4 | 5 | 4.9 | 3.0 | O | Δ | Δ |
| 4 | 6.2 | 5.5 | 10 | 6.8 | 0.4 | X | X | Δ |
| 5 | 7.0 | 5.5 | whole surface (25) | 7.0 | — | Δ | X | X |

As is apparent from the results of the Examples compared with those of the Comparative Examples on Table 3, the physicohemical properties of the materials treated with the compositions of the present invention are significantly better than the those of the materials treated with the compositions in the Comparative Examples, not only in mildewproofing and stainproofing, but also in waterproofness and durability.

From the foregoing description, one skilled in the art can easily ascertain the essential characteristics of this invention, and without departing from the spirit and scope thereof, he can make various changes and modifications of the invention to adapt it to various usages and conditions.

What is claimed is:

1. An impregnating waterproofing composition comprising:

(A) 98 to about 99.9 parts by weight of an organosilicon compound represented by the formula:

N—$C_{10}H_{21}Si(OCH_3)$, and (B) about 0.1 to 2 parts by weight of another organosilicon compound represented by the formula:

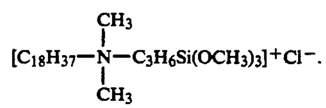

2. The composition of claim 1, wherein component A is present in an amount of 98 parts by weight and component B is present in an amount of 2 parts by weight.

* * * * *

UNITED STATES PATENT AND TRADEMARK OFFICE
CERTIFICATE OF CORRECTION

PATENT NO. : 5,319,049

DATED : June 7, 1994

INVENTOR(S) : Yoshioka et al.

It is certified that error appears in the above-identified patent and that said Letters Patent is hereby corrected as shown below:

Claim 1, column 8, line 45, "N-$C_{10}H_{21}Si(OCH_3)$" should read --n-$C_{10}H_{21}Si(OCH_3)$--.

Signed and Sealed this

Twenty-third Day of August, 1994

Attest:

BRUCE LEHMAN

Attesting Officer

*Commissioner of Patents and Trademarks*